United States Patent [19]

Kersey et al.

[11] Patent Number: 5,104,222
[45] Date of Patent: Apr. 14, 1992

[54] SYSTEM AND METHOD FOR MINIMIZING INPUT POLARIZATION-INDUCED PHASE NOISE IN AN INTERFEROMETRIC FIBER-OPTIC SENSOR DEPOLARIZED INPUT LIGHT

[75] Inventors: Alan D. Kersey, Springfield, Va.; Michael J. Marrone, Severna Park, Md.; Anthony Dandridge, Alexandria, Va.

[73] Assignee: The United States of America as represented by the Secretary of the Navy, Washington, D.C.

[21] Appl. No.: 584,221

[22] Filed: Sep. 18, 1990

[51] Int. Cl.$^5$ ............................................. G01B 9/02
[52] U.S. Cl. ................................... 356/345; 356/351
[58] Field of Search ............... 356/345, 351, 350, 358, 356/349; 250/227.17

[56] References Cited

U.S. PATENT DOCUMENTS 4,897,543  1/1990  Kersey ................................ 250/227
4,932,783  6/1990  Kersey et al. ....................... 356/345

OTHER PUBLICATIONS

Publication, "Dependence of Visibility on Input Polarization in Interferometric Fiber-Optic Sensors", by A. D. Kersey et al., Optics Letters, vol. 13, Apr. 1988, pp. 288-290.
Publication, "Observation of Input-Polarization-Induced Phase Noise in Interferometric Fiber-Optic Sensors", by Alan D. Kersey et al., Optics Letters, vol. 13, No. 10, Oct. 1988, pp. 847-849.
Publication, "Demonstration of Lead Sensitivity of a Fiber Interferometer Due to Magneto-Optically Induced Input Polarization Fluctuation", by A. D. Kersey et al., Optical Fiber Sensors, Springer Proceedings in Physics, vol. 44, 1989, pp. 166-171.
Publication, "Monomode Fibre Polarization Scrambler", by A. D. Kersey et al., Electronics Letters, vol. 23, No. 12, Jun. 4, 1987, pp. 634-636.
Publication, "Analysis of Input-Polarization-Induced Phase Noise in Interferometric Fiber-Optic Sensors and Its Reduction Using Polarization Scrambling", by Alan D. Kersey et al., Journal of Lightwave Technology, vol. 8, No. 6, Jun. 1990, pp. 838-845.

Primary Examiner—Samuel A. Turner
Assistant Examiner—Richard E. Kurtz, II
Attorney, Agent, or Firm—Thomas E. McDonnell; George Jameson

[57] ABSTRACT

A system and method for minimizing polarization-induced phase noise in an interferometric fiber sensor is disclosed. The system includes an optical source of light; a single mode input fiber; means coupled between the optical source and the input fiber for scrambling the polarization state of the light from the optical source at a first frequency to effectively produce and pass depolarized light to the input fiber; an interferometric fiber sensor responsive to light from the input fiber for producing at its output an interference pattern proportional to a phase shift produced by a field being sensed by the interferometric fiber sensor; detection means responsive to the interference pattern for developing a photocurrent signal averaged over a period of time longer than the period of the first frequency; and demodulation means responsive to the photocurrent signal for producing an electrical output signal substantially proportional to the phase shift produced by the field being sensed by the interferometric sensor.

22 Claims, 6 Drawing Sheets

INPUT POLARIZATION NOISE →

INTERFEROMETER OUTPUT PHASE NOISE →

SYSTEM AND METHOD FOR MINIMIZING INPUT POLARIZATION-INDUCED PHASE NOISE IN AN INTERFEROMETRIC FIBER-OPTIC SENSOR DEPOLARIZED INPUT LIGHT

BACKGROUND OF THE INVENTION

1. Field of the Invention

The present invention relates to input polarization-induced phase noise in interferometric fiber-optic sensors and particularly to a system and method for minimizing such polarization-induced noise in an interferometric fiber-optic sensor by scrambling the state of polarization of the light input to the interferometer in such a sensor.

2. Description of the Prior Art

In recent years interferometric fiber-optic sensors have been configured to detect a wide range of physical fields, such as acoustic waves and temperature fluctuations. These sensors typically operate with high sensitivity, good linearity, and over a wide dynamic range.

In operation, an interferometric fiber-optic sensor combines the light beams from two optical paths (through signal and reference arms) in the interferometer of the sensor and causes them to interfere to produce an interference pattern that is proportional to the field being sensed by the sensor. Fluctuations in the polarization state of the input light to the sensor can lead to the generation of phase noise in the output interference signal of the sensor.

It is commonly assumed that interferometric fiber sensors are "lead insensitive", or that perturbations of the input fiber to an interferometer or to the output fiber from that interferometer do not give rise to a shift in the phase of the interference signal generated at the associated detector. However, it can be shown that fluctuations in the input state of polarization (SOP) to an interferometric sensor can result in the generation of phase noise in the demodulated output of the interferometric fiber sensor.

OBJECTS OF THE INVENTION

Accordingly, it is an object of this invention to provide an improved system and method therefore for minimizing polarization-induced phase noise in an interferometric fiber optic sensor.

Another object of this invention is to provide a system and method therefor for minimizing polarization-induced phase noise in an interferometric fiber-optic sensor by scrambling the state of polarization of the input light to the interferometer in such a sensor.

SUMMARY OF THE INVENTION

These and other objects of this invention are achieved by providing a system and method for minimizing polarization-induced phase noise in an interferometric fiber sensor. The system includes an optical source of light; a single mode input fiber; means coupled between the optical source and the input fiber for scrambling the polerization state of the light from the optical source at a first frequency to effectively produce and pass depolarized light to the input fiber; an interferometric fiber sensor responsive to light from the input fiber for producing at its output an interference pattern proportional to a phase shift produced by a field being sensed by the interferometric fiber sensor; detection means responsive to the interference pattern for developing a photocurrent signal averaged over a period of time longer than the period of the first frequency; and demodulation means responsive to the photocurrent signal for producing an electrical output signal substantially proportional to the phase shift produced by the field being sensed by the interferometric sensor.

BRIEF DESCRIPTION OF THE DRAWINGS

These and other objects, feature and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Before the structure and operation of the invention are discussed, the polarization properties of two-beam interferometers will be analyzed to better understand the concepts involved in the invention. Although a Mach-Zehnder interferometer will be discussed specifically in this analysis, it should be understood that such analysis is equally applicable to other two-beam interferometers, such as a Michelson interferometer.

Figure 1A:
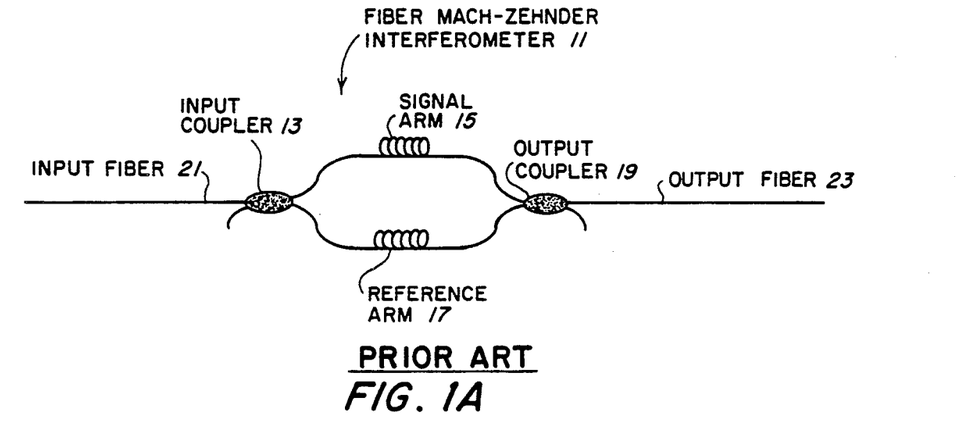
FIG. 1A illustrates a schematic diagram of a Mach-Zehnder interferometer.

Referring now to the Figures, FIG. 1A illustrates a fiber Mach-Zehnder interferometer 11 comprising an input coupler 13, signal and reference arms 15 and 17, and an output coupler 19. In the operation of the Mach-Zehnder interferometer 11, input light is propagated in an optical input fiber 21 to the input coupler 13, which splits the light into two light beams. One beam passes through the signal arm 15, which is subjected to an external field (e.g. acoustic, magnetic). This external field changes the phase of the beam as a function of the physical parameter or external field being sensed. The other beam passes through the reference arm 17, which is isolated from any external perturbations. As a result, the signal and reference beams will interfere with each other to cause an optical interference pattern to be produced at the output of the coupler 19. This interference pattern is then propagated through an optical output fiber 23 for further processing.

It is well known that the net birefringence in a length of optical fiber can be described by means of a general elliptic retarder denoted by an operator $R_j$ of rotational magnitude (phase delay) $\Omega_j$, and expressed as $R_j(\Omega_j)$ on a Poincare Sphere.

Figure 1B:
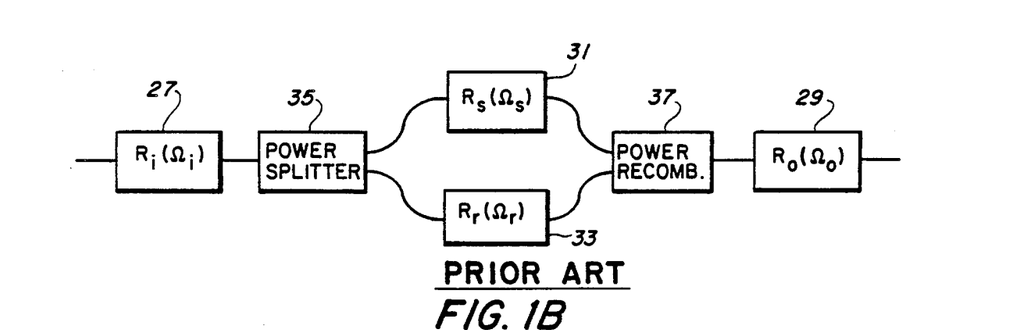
FIG. 1B shows a birefringent network used to model the interferometer of FIG. 1A.

FIG. 1B shows a birefringent network used to model the interferometric system of FIG. 1A. The birefringent network of FIG. 1B includes elliptic retarders 27, 29, 31 and 33 to respectively describe the net birefringence in the input and output fibers 21 and 23 and in the signal and reference arm fibers 15 and 17 of the interferometer 11 of FIG. 1A. The couplers 13 and 19 of FIG 1A are modeled in FIG. 1B as ideal 1:1 power splitters 35 and 37, with power splitter 37 operating as a power recombiner. The birefringence effects of the power splitter 35 and power combiner 37 are lumped into the four primary operators shown in retarders 27, 29, 31 and 33.

Figure 1C:
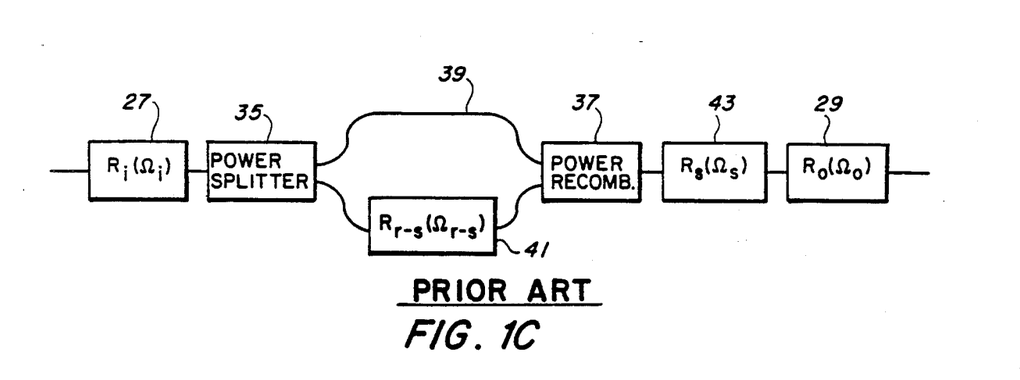
FIG. 1C shows a second equivalent birefringent network which can be used to model the interferometer of FIG. 1A.

FIG. 1C shows a second equivalent birefringent network which can be used to model the interferometric system of FIG. 1A. More specifically, FIG. 1C shows how FIG. 1A can be analyzed with just one birefringent operator representing the fiber arms. On the other hand, the birefringent network of FIG. 1B showed how to conventionally analyze FIG. 1A with a different birefringent operator representing each of the fiber signal and reference arms 15 and 17 of FIG. 1A.

In the birefringent network of FIG. 1C, the interferometer output at the point of the recombination of the signal and reference light (the output of the power recombiner 37) is viewed in a frame of reference rotated by $R_s^{-1}$. As a result, an additional elliptic retarder 43 must be inserted between the power recombiner 37 and the elliptic retarder 29. In this new frame of reference the signal arm 39 appears isotropic (where the net operator $R_s^{-1} \cdot R_s = 1$), whereas the reference arm operator 41 is $R_{r-s}$ ($\Omega_{r-s} = R_s^{-1} \cdot R_r$. This operator is a unique parameter of the interferometric system which essentially describes the "differential-birefringence" between the fiber arms (15 and 17 of FIG. 1A), and can be used to analytically express the visibility of the interferometer 11 in terms of the input SOP $C_i$.

Figure 2:
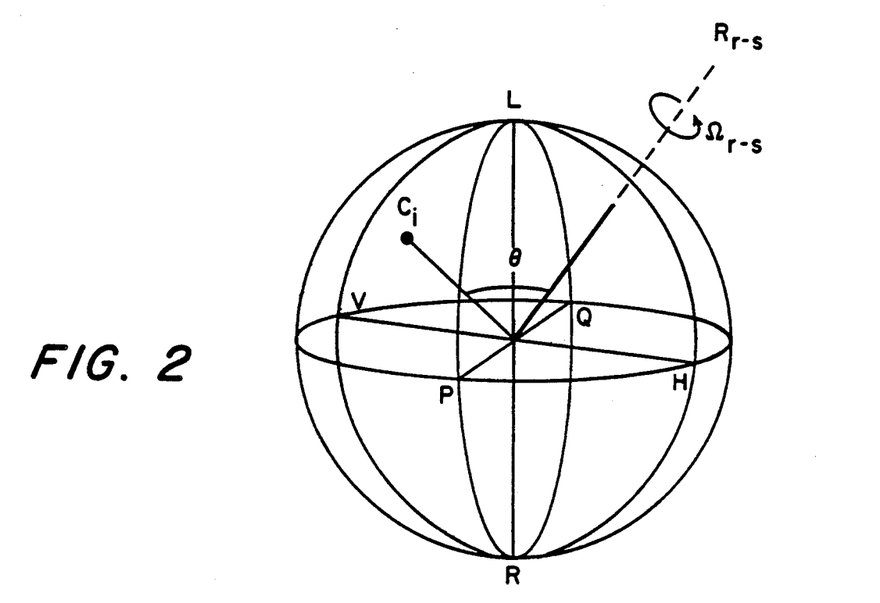
FIG. 2 illustrates a Poincare Sphere representation of the differential elliptical retarder $R_{r-s}$ of rotational magnitude $\Omega_{r-s}$ which can be used to describe the polarization properties of an interferometric system.

Referring now to FIG. 2, FIG. 2 illustrates a Poincare Sphere representation of the differential operator $R_{r-s}$ which can be used to describe the polarization properties of the interferometer of FIG. 1A. For an input state of polarization (SOP) aligned with either of the eigenvectors of $R_{r-s}$, the SOPs of light derived from the signal and reference arms 15 and 17 (FIG. 1A) must be coincident. Consequently, the two input SOPs aligned with the eigenvectors of $R_{r-s}$ behave as eigenmodes of the interferometer for which optimum visibility can be achieved. For an arbitrary input SOP, $C_i$, the visibility and output phase shift can be calculated by resolving the input state onto the two eigenmodes, and summing the output interference intensities (scaler summation of orthogonal polarization components). If the input SOP subtends an angle $\theta$ to the eigenmode vector $R_{r-s}$, then the output interference comprises two components given by:

$$I_a = I_0[\cos^2(\theta/2)\{1+\cos(\phi+\Omega_{r-s}/2)\}]/2 \quad (1)$$

$$I_b = I_0[\sin^2(\theta/2)\{1+\cos(\phi-\Omega_{r-s}/2)\}]/2 \quad (2)$$

where $\Omega_{r-s}$ is the rotation magnitude of $R_{r-s}$. The total output interference intensity is thus:

$$\begin{aligned} I &= I_a + I_b \quad (3)\\ &= I_0[1 + \cos^2(\theta/2)\{\cos(\phi)\cos(\Omega_{r-s}/2) - \sin(\phi)\sin(\Omega_{r-s}/2)\} + \sin^2(\theta/2)\{\cos(\phi)\cos(\Omega_{r-s}/2) + \sin(\phi)\sin(\Omega_{r-s}/2)\}]/2\\ &= I_0[1 + \cos(\phi)\cos(\Omega_{r-s}/2) - \cos(\theta)\sin(\phi)\sin(\Omega_{r-s}/2)]/2\\ &= I_0[1 + \{\cos^2(\Omega_{r-s}/2) + \cos^2(\theta)\sin^2(\Omega_{r-s}/2)\}^{\frac{1}{2}}\cos(\phi - \gamma)]/2, \end{aligned}$$

where $$\tan\gamma = \tan(\Omega_{r-s}/2)\cos\theta. \quad (4)$$

This phase offset term is dependent on the position of the input SOP relative to the eigenvector $R_{r-s}$ and the rotational magnitude $\Omega_{r-s}$.

Figure 3:
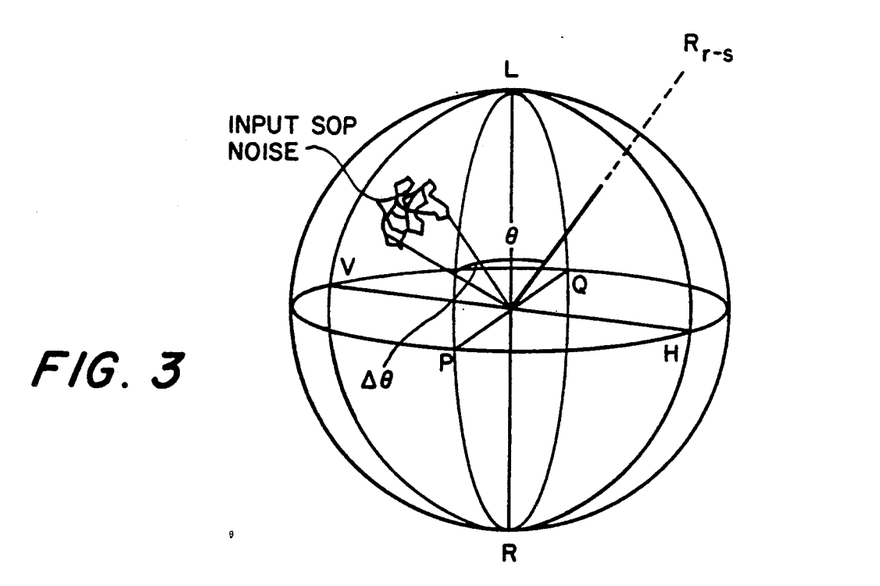
FIG. 3 illustrates the effect of input polarization noise on the angle $\theta$ of FIG. 2.

Random fluctuations in the SOP reaching the interferometer 11 (FIG. 1A) due to, for example, mechanical perturbations of the input fiber 21 give rise to changes in $\theta$, as shown diagrammatically using the Poincare Sphere representation in FIG. 3. This fluctuation in $\theta$ leads to variations in $\gamma$ according to equation (4), resulting in input-polarization induced phase-noise. The phase noise $\Delta\gamma$ resulting from a polarization-noise fluctuation $\Delta\theta$ (assuming $\Delta\theta \ll 1$) is by equation (4):

$$\begin{aligned}\Delta\gamma &= (\delta\gamma/\delta\theta) \Delta\theta = [\tan(\Omega_{r-s}/2)\sin\theta]\\ &\Delta\theta/[1+\tan^2(\Omega_{r-s}/2)\cos^2\theta)] \end{aligned} \quad (5)$$

From equation (3), the visibility can be seen to be given by the expression:

$$\begin{aligned} V &= \{\cos^2(\Omega_{r-s}/2) + \cos^2(\theta)\sin^2(\Omega_{r-s}/2)\}^{\frac{1}{2}}\\ &= \{1 - \sin^2\theta \sin^2(\Omega_{r-s}/2)\}^{\frac{1}{2}}. \end{aligned} \quad (6)$$

Clearly, equation (6) shows that if $\Omega_{r-s} < \pi$(modulo $2\pi$), then $V > 0$ for all input SOPs, i.e., the visibility varies between the limits of:

$$V_{max} = 1 \text{ and } V_{min} = \cos(\Omega_{r-s}/2), \quad (7)$$

which occur when $\theta = 0$ and $\theta = \pi/2$, respectively. For a constant value of $\Omega_{r-s}$, the input-polarization-induced phase noise $(\delta\gamma/\delta\theta)$ is minimum when $\theta \sim 0$ (i.e., around maximum visibility) and is maximized when $\theta \sim \pi/2$ (i.e., near minimum visibility).

Figure 4:
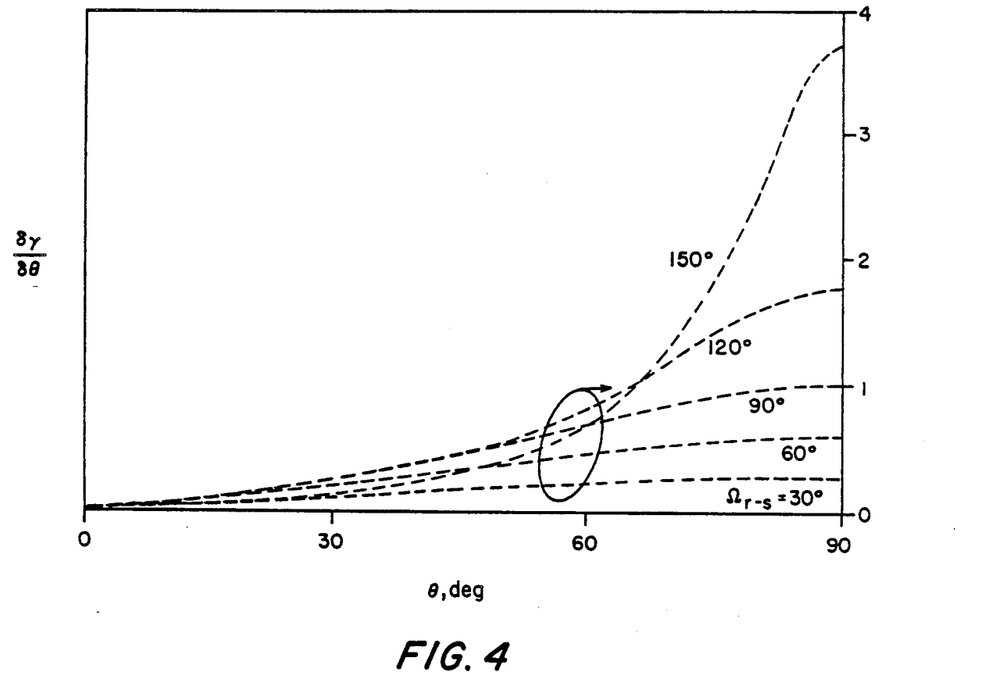
FIG. 4 illustrates theoretical curves showing the dependence of the phase noise $\delta\gamma$ of the interferometer of FIG. 1A to input polarization fluctions $\delta\theta$ as a function of $\theta$, as defined by equation (5), for various values of $\Omega_{r-s}$.

FIG. 4 shows theoretical curves of $(\delta\gamma/\delta\theta)$ vs. $\theta$ for various values of $\Omega_{r-s}$. As seen from FIG. 4, in cases where the visibility fades close to zero (i.e., for $\Omega_{r-s}$ approaching $\pi$), the input-polarization noise to phase-noise conversion factor, $(\delta\gamma/\delta\theta)$, can be quite large.

Figure 5:
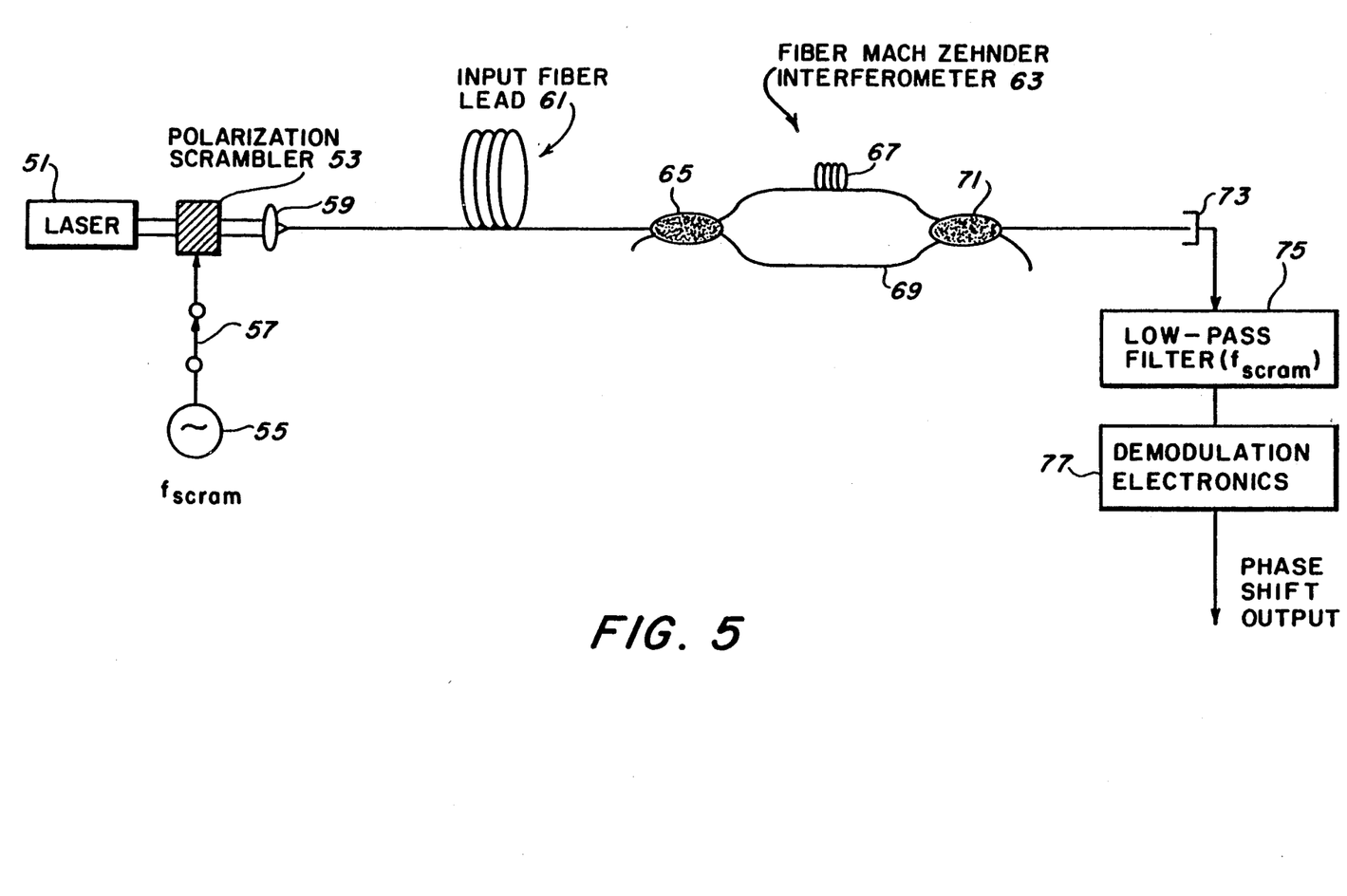
FIG. 5 illustrates a schematic block diagram of a preferred embodiment of the invention.

The embodiment of FIG. 5 substantially eliminates this source of excess phase noise in interferometric systems by using depolarized or polarization-scrambled input light. Before FIG. 5 is explained in detail, the operation of an interferometric sensor using unpolarized input light will be discussed.

Assume that input light to an interferometric system is completely unpolarized, such that it can be resolved into two mutually incoherent orthogonal polarization components of equal intensity. As any arbitrary pair of orthogonal components can be chosen to represent the unpolarized input light, they can be chosen to match the eigenmodes of the differential operator $R_{r-s}$. The interferometer output is thus comprised of two interference terms generated by the two components of the unpolarized input light. Since orthogonal input components have been chosen which align with the eigenmodes of $R_{r-s}$, these interference terms are each of optimum visibility and have a relative phase shift of $\Omega_{r-s}$ between them, i.e.

$$I^u_1 = I_o\{1 + \cos(\phi + \Omega_{r-s}/2)\}/2$$

$$I^u_2 = I_o\{1 + \cos(\phi - \Omega_{r-s}/2)\}/2$$

The total output interference intensity, $I^u$, of an interferometer illuminated using unpolarized source light is thus $$I^u = I_o[2 + \cos(\phi + \Omega_{r-s}/2) + \cos(\phi - \Omega_{r-s}/2)]/4 \quad (8)$$
$$= I_o[1 + \cos(\Omega_{r-s}/2)\cos(\phi)]/2,$$

where $\phi$ is the difference in phase shift experienced by the light on propagation through the signal and reference arms, and $I_o$ is the input intensity of the unpolarized light. The output visibility of a fiber interferometer illuminated using unpolarized light is thus $V_{up} = \cos(\Omega_{r-s}/2)$, which is independent of the polarization properties of the input fiber lead, but depends on the rotational magnitude of the differential operator $R_{r-s}$. The phase shift of the interference output is also independent of the polarization properties of the input lead, and thus input-polarization induced phase noise can be eliminated by depolarization of the input light at the price of a reduced but stable visibility. It should be noted that the form of the output interference intensity $I^U$ described by equation (8) is dependent on the cosine of $\phi$ (the difference in phase shift experienced by the light propagation through the signal and reference arms). In order to obtain an electronic signal directly proportional to $\phi$, the nonlinear cosine transfer function has to be linearized. This process is commonly referred to as "demodulation". The electronic means required to perform this demodulation could involve, for example, the use of phase generated carrier, active tracking homodyne or heterodyne detection. The details are not important to the understanding or operation of the invention.

Referring now to FIG. 5, a schematic block diagram of a preferred embodiment of the invention will now be discussed.

Light from a radiation source or laser 51 is transmitted into a polarization scrambler or polarization modulator 53, which is driven at a relatively high frequency, $f_{scram}$, by a signal applied from an electrical oscillator 55 by way of a closed polarization scrambler switch 57. The polarization scrambler 53 scrambles the polarization state of the laser light at the $f_{scram}$ frequency to effectively produce depolarized light at the output of the polarization scrambler 53.

The polarization scrambler 53 could be, for example, a photoelastic birefringent modulator, a piezoelectric fiber-based modulator, an integrated optic modulator, a birefringent fiber modulator, a Kerr optic cell or anything that can modulate the polarization state of the light from the laser 51.

The effectively depolarized light from the polarization scrambler 53 is focused by a lens 59 into an input fiber lead 61 to a fiber interferometer, such as the illustrated Mach Zehnder interferometer 63. It should be noted that the input fiber lead 61 can be in a noisy environment or could be subjected to mechanical perturbations which, as discussed above, could typically cause input-polarization induced phase noise in prior art interferometric fiber sensors.

The light that is passed through the input fiber lead 61 to the interferometer 63 is split by an input coupler 65 into signal and reference arms 67 and 69, respectively, and then recombined in an output coupler 71 to form an optical output at the output of the coupler 71. This optical output includes an interference pattern component which was developed by the interferometer 63 and a polarization modulating frequency $f_{scram}$ component which was used by the polarization scrambler 53 to develop the depolarized light at the output of the scrambler 53. Only the interference pattern is of interest at the output of the system of FIG. 5. The modulating frequency $f_{scram}$ component must be eliminated, as will be discussed.

The optical output of the interferometer 63 is detected by detection means (to be explained) to develop a photocurrent signal averaged over a period of time longer than the period of the frequency $f_{scram}$. There are two ways that this can be done.

In a first way, the optical output of the interferometer is detected by a detector 73. If the detector 73 has a fast response to the polarization modulating frequency $f_{scram}$, then the modulating frequency $f_{scram}$ component will be at the output of the detector 73 along with the interference pattern component. In this case a low pass filter 75 is utilized to detect the output of the detector 73. This low pass filter 75 has a low frequency cutoff to enable the filter 75 to only pass frequencies much lower than the polarization modulation frequency $f_{scram}$. Thus, in this first way both the detector 73 and the low pass filter 75 were required to eliminate the modulating frequency $f_{scram}$ component from the optical output before the interference pattern component is demodulated.

In a second way, if the detector 73 is designed to be so slow that it cannot respond to the polarization modulating frequency $f_{scram}$ component, then the low pass filter 75 is not needed.

An important feature of the invention is to modulate the polarization of the laser light at such a fast rate that this polarization modulating frequency $f_{scram}$ component basically cannot be seen at the output of a very slow detector 73 for the first way or at the output of the filter 75 for the second way.

The output of the detector 73 for the first way or the output of the filter 75 for the second way is applied to demodulation electronics 77 to produce an electrical output signal that is substantially proportional to the phase shift produced by the field being sensed by the interferometric fiber sensor 63. The particular demodulation technique used here is not important for understanding the invention and will therefore not be further discussed. It is sufficient to say that the demodulation technique used could involve, for example, the use of phase generated carrier, active phase tracking homodyne or heterodyne detection.

Figure 6:
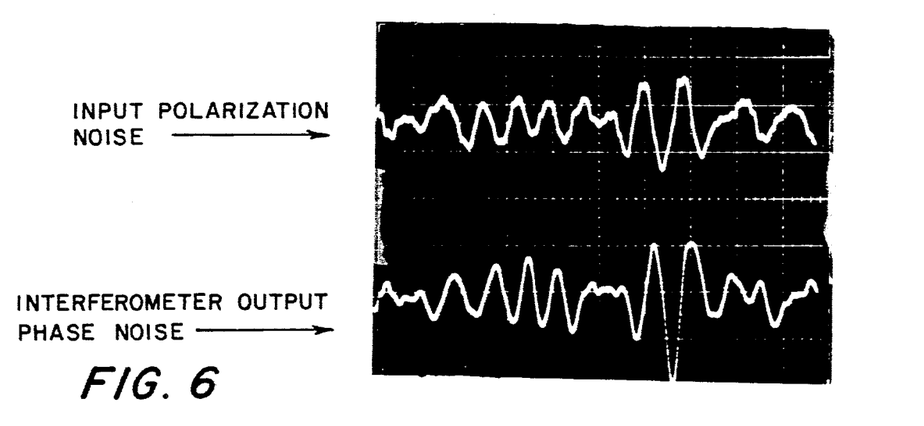
FIGS. 6 shows waveforms illustrating the operation of the preferred embodiment of FIG. 5 when the polarization scrambler switch of FIG. 5 is open.

FIG. 6 shows waveforms illustrating the operation of the system of FIG. 5 when the polarization scrambler switch 57 of FIG. 5 is open or off. The upper waveform represents the input polarization noise in the input fiber lead 61 when the lead was exposed to a noisy environment such as by a mechanical perturbation. This input polarization noise was measured by tapping off a small fraction of the light in the input fiber lead 61 (by means not shown). The lower waveform represents the output phase noise at the interferometer output (output of the demodulation electronics 77) when the input fiber lead 61 was subjected to the exemplary mechanical noise.

Note the close correlation between the upper and lower waveforms. The upper and lower waveforms of FIG. 6 show the conversion of input polarization noise into phase noise at the interferometer output, and thus the "lead sensitivity" of an interferometer device. It should be noted that when the polarization scrambler switch 57 of FIG. 5 is closed, the lower waveform changes to a straight line, indicating that no polarization-induced phase noise is present at the output of the interferometer sensor system.

Figure 7A:
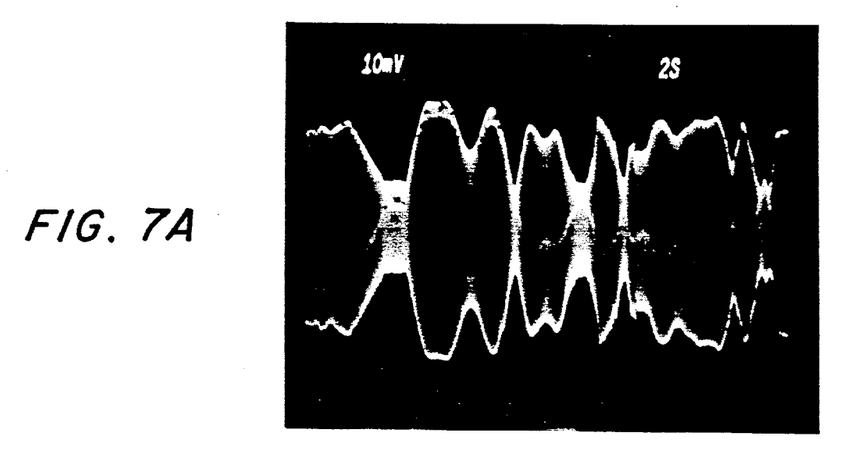
FIGS. 7A and 7B show waveforms at the output of the interferometer of FIG. 5 with input polarization noise present under two different operating conditions.
Figure 7B:
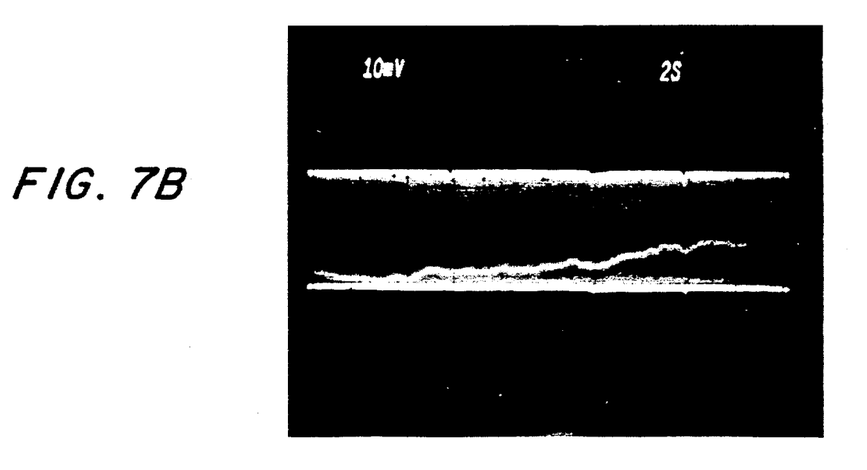

FIGS. 7A and 7B show waveforms at the output of the fiber interferometer of FIG. 5 with input polarization noise present under two different operating conditions.

FIG. 7A shows the interferometer output when the polarization scrambler switch 57 is turned off. The fluctuations in the visibility, or amplitude of the signal, can be readily seen. In addition to the fluctuations in the signal amplitude, the mean phase shift of the interferometer also fluctuates with time, as shown by the dotted line in FIG. 7A.

FIG. 7B shows the interferometer output when the polarization scrambler switch 57 is turned on. Note the constant amplitude of the signal (or fringes). Also note the constant phase angle in the interferometer, as shown by the dotted line in FIG. 7B.

Figure 8A:
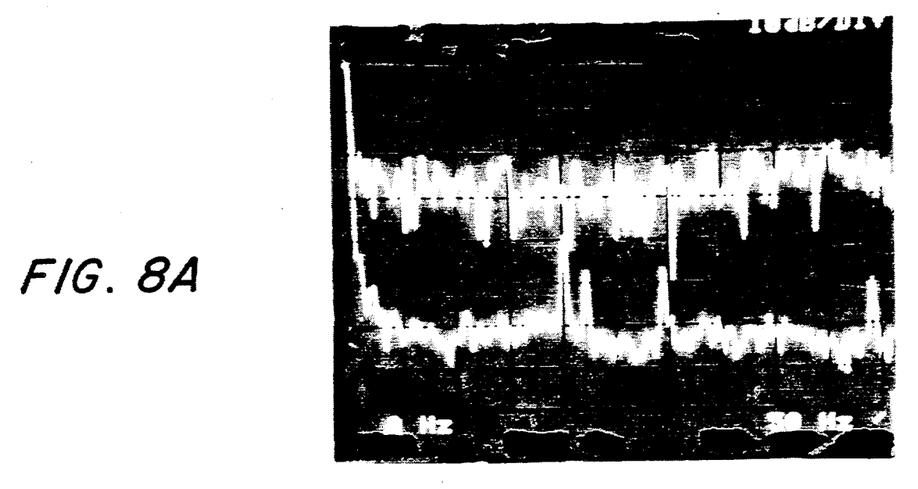
FIGS. 8A and 8B show the spectrum of the noise signal obtained at the output of the interferometer of FIG. 5 under various operating conditions.
Figure 8B:
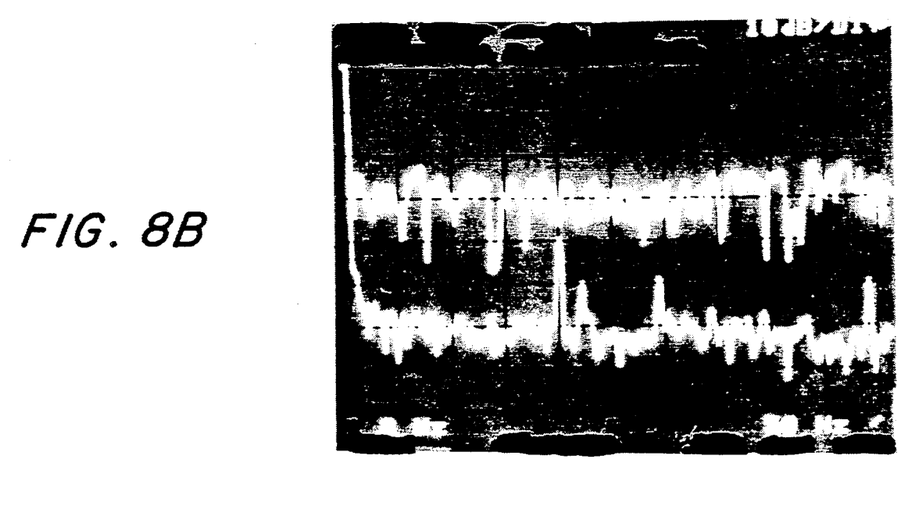

FIGS. 8A and 8B show the spectrum of the noise signal obtained at the interferometer output in the system of FIG. 5 under various operating conditions. The spikes shown in FIGS. 8A and 8B were caused by stray pickup within the interferometer system of FIG. 5 and not by external noise sources.

The upper and lower waveforms of FIG. 8A were derived with the polarization scrambler switch 57 of FIG. 5 turned off. The lower waveform of FIG. 8A shows the noise floor of the interferometer output without any mechanical perturbation of the input fiber lead. The upper waveform of FIG. 8A shows the increased phase noise that results at the interferometer output when the input fiber lead 61 is mechanically perturbed by a noise source. The noise at the interferometer output increased by over 30 decibels when the input fiber lead was mechanically perturbed.

The upper waveform of FIG. 8B also shows excess noise at the interferometer output when the input fiber lead 61 is mechanically perturbed by a noise source. The lower waveform of FIG. 8B shows the reduction in the noise at the interferometer output when the polarization scrambler switch 57 of FIG. 5 is turned on to enable the polarization scrambler 53. That noise decreases by about 30 decibels and achieves a level close to the level shown in the lower waveform in FIG. 8A (where the input fiber lead 61 is not mechanically perturbed), which means that the noise at the interferometer output is practically eliminated when the polarization scrambler 53 is turned on by the switch 57.

Therefore, what has been described in a preferred embodiment of the invention is a system for substantially eliminating input-polarization induced phase noise in an interferometric fiber sensor by using depolarized input light.

It should therefore readily be understood that many modifications and variations of the present invention are possible within the purview of the claimed invention. It is therefore to be understood that, within the scope of the appended claims, the invention may be practiced otherwise than as specifically described.

What is claimed is:

1. A system comprising:
   an optical source of light;
   a single mode input fiber;
   means coupled between said optical source and said single mode input fiber for scrambling the polarization state of the light from said optical source at a first frequency to produce and pass effectively depolarized light into said single mode input fiber;
   an interferometric fiber sensor responsive to said effectively depolarized from said single mode input fiber for producing at its output an optical signal containing a first signal component at said first frequency and an interference pattern component proportional to a phase shift produced by a field being sensed by said interferometric fiber sensor; and
   detection means responsive to said optical signal for eliminating said first signal component and for developing from said optical signal a photocurrent signal averaged over a period of time longer than the period of said first frequency in order to only pass said interference pattern component.

2. The system of claim 1 wherein:
   said optical source of light is a laser.

3. The system of claim 1 wherein said scrambling means includes:
   an oscillator for producing a first signal at said first frequency; and
   a polarization scrambler responsive to said first signal and to said light from said source for modulating said polarization state of said light from said source at said first frequency of said first signal to produce said effectively depolarized light.

4. The system of claim 3 wherein said polarization scrambler includes:
   a photoelastic birefringent modulator.

5. The system of claim 3 wherein said polarization scrambler includes:
   a piezoelectric fiber-based modulator.

6. The system of claim 3 wherein said polarization scrambler includes:
   an integrated optic modulator.

7. The system of claim 3 wherein said polarization scrambler includes:
   a birefringent fiber modulator.

8. The system of claim 3 wherein said polarization scrambler includes:
   a Kerr optic cell.

9. The system of claim 3 wherein:
   said polarization scrambler is selected from the group consisting of a photoelastic birefringent modulator, a piezoelectric fiber-based modulator, an integrated optic modulator, a birefringent fiber modulator, and a Kerr optic cell.

10. The system of claim 1 wherein said scrambling means includes:
    an oscillator for producing a first signal at said first frequency;
    a polarization scrambler responsive to said first signal and to said light from said source for modulating the polarization state of said light at said first frequency of said first signal to produce said effectively depolarized light; and
    lens means for focusing said effectively depolarized light into said single mode input fiber.

11. The system of claim 10 wherein:
said polarization scrambler is selected from the group consisting of a photoelastic birefringent modulator, a piezoelectric fiber-based modulator, an integrated optic modulator, a birefringent fiber modulator, and a Kerr optic cell.

12. The system of claim 10 wherein:
said interferometric fiber sensor is a Mach Zehnder interferometer.

13. A system comprising:
an optical source of light;
a single mode input fiber:
means coupled between said optical source and said single mode input for scrambling the polarization state of the light from said optical source at a preselected frequency to produce and pass effectively depolarized light into said single mode input fiber;
an interferometric fiber sensor responsive to said effectively depolarized light from said single mode input fiber for producing an optical comprised of an interference pattern component proportional to a phase shift produced by a field being sensed by said interferometric fiber sensor and a first signal component at said preselected frequency;
detection means responsive to said optical output for developing a photocurrent signal averaged over a period of time longer than the period of said preselected frequency so that said first signal component at said preselected frequency is rejected and only said interference pattern component is contained in said photocurrent signal.

14. The system of claim 13 wherein said photocurrent signal is representative of the cosine of an interferometric phase difference produced by said interferometric fiber sensor in response to said effectively depolarized light and the field being sensed by said interferometric fiber sensor and wherein said system further includes:
demodulation means responsive to said photocurrent signal for producing an electrical output signal substantially proportional to the phase shift produced by the field being sensed by said interferometric fiber sensor.

15. The system of claim 1 wherein said photocurrent signal is representative of the cosine of the phase shift produced by the field being sensed by said interferometric fiber sensor and wherein said system further includes:
demodulation means responsive to said photocurrent signal for producing an electrical output signal substantially proportional to the phase shift produced by the field being sensed by said interferometric fiber sensor.

16. A method for minimizing input polarization-induced phase noise in an interferometric fiber optic sensor, said method comprising the steps of:
scrambling the polarization state of input laser light at a preselected frequency to produce and pass effectively depolarized light to a single mode input fiber;
passing the effectively depolarized light from the single mode input fiber into an interferometric fiber sensor;
producing at the output of the interferometric fiber sensor an optical output comprised of an interference pattern proportional to a phase shift produced by a field being sensed by the interferometric fiber sensor and a first signal component at the preselected frequency;
developing from the optical output a photocurrent signal averaged over a period of time longer than the period of the preselected frequency in order to only pass the interference pattern; and
producing from the interference pattern an electrical output signal substantially proportional to the phase shift produced by the field being sensed by the interferometric fiber sensor.

17. The system of claim 15 wherein:
said detection means includes:
a detector having a fast response to said first frequency for developing a detector output containing both said interference pattern component and said first signal component at said first frequency; and
a low pass filter having a low frequency cutoff to reject said first signal component at said first frequency and to only pass said interference pattern component to said demodulation means.

18. The system of claim 15 wherein:
said detection means includes:
a detector having a sufficiently slow response to said first frequency such that said detector cannot respond to said first frequency and only passes said interference pattern component to said demodulation means.

19. The system of claim 13 wherein said detection means includes:
a detector having a fast response to said preselected frequency for developing a detector output containing both said interference pattern component and said first signal component at said preselected frequency; and
a low pass filter having a low frequency cutoff to reject said first signal component at said preselected frequency and to pass only said interference pattern component to said demodulation means.

20. The system of claim 13 wherein said detection means includes:
a detector having a sufficiently slow response to said preselected frequency such that said detector cannot respond to said preselected frequency and only passes said interference pattern component to said demodulation means.

21. The system of claim 13 wherein said scrambling means includes:
an oscillator for producing a first signal at said first frequency; and
a polarization scrambler responsive to said first signal and to said light from said source for modulating said polarization state of said light from said source at said first frequency of said first signal to produce said effectively depolarized light.

22. The system of claim 21 wherein:
said polarization scrambler is selected from the group consisting of a photoelastic birefringent modulator, a piezoelectric fiber-based modulator, an integrated optic modulator, a birefringent fiber modulator, and a Kerr optic cell.

* * * * *